United States Patent [19]

Brossman et al.

[11] 4,220,115
[45] Sep. 2, 1980

[54] LUMBER MARKING APPARATUS

[75] Inventors: William C. Brossman, East Earl; Joseph G. McElhaney, Wrightsville; James H. Rooney, III, Lancaster, all of Pa.

[73] Assignee: Armstrong Cork Company, Lancaster, Pa.

[21] Appl. No.: 889,266

[22] Filed: Mar. 23, 1978

[51] Int. Cl.² ............................................. B05C 11/00
[52] U.S. Cl. .................................... 118/684; 83/371; 118/670; 118/704; 118/314; 427/424
[58] Field of Search .................. 118/8, 684, 670, 704, 118/314; 83/371; 427/424

[56] References Cited

U.S. PATENT DOCUMENTS

| 3,120,861 | 2/1964 | Finlay et al. | 83/371 X |
| 3,329,181 | 7/1967 | Buss et al. | 83/371 X |
| 3,670,209 | 6/1972 | Hensen | 317/135 |
| 3,780,777 | 12/1973 | Davies | 83/371 X |
| 3,848,646 | 11/1974 | Miles | 83/371 |
| 3,856,061 | 12/1974 | Miles | 83/371 |
| 3,942,021 | 3/1976 | Barr et al. | 83/371 |

Primary Examiner—Shrive P. Beck

[57] ABSTRACT

An apparatus for spray marking lumber boards with paint at predetermined locations while they are being conveyed past the device for further processing. A tachometer and a photoelectric unit are employed for determining the location and speed of the board. A solenoid-operated paint sprayer is used to deliver the paint to the boards. Electronic control circuitry is provided to activate the paint sprayer and properly coordinate the operation of paint sprayer with the location and speed of the board so the board is marked at the desired locations.

2 Claims, 4 Drawing Figures

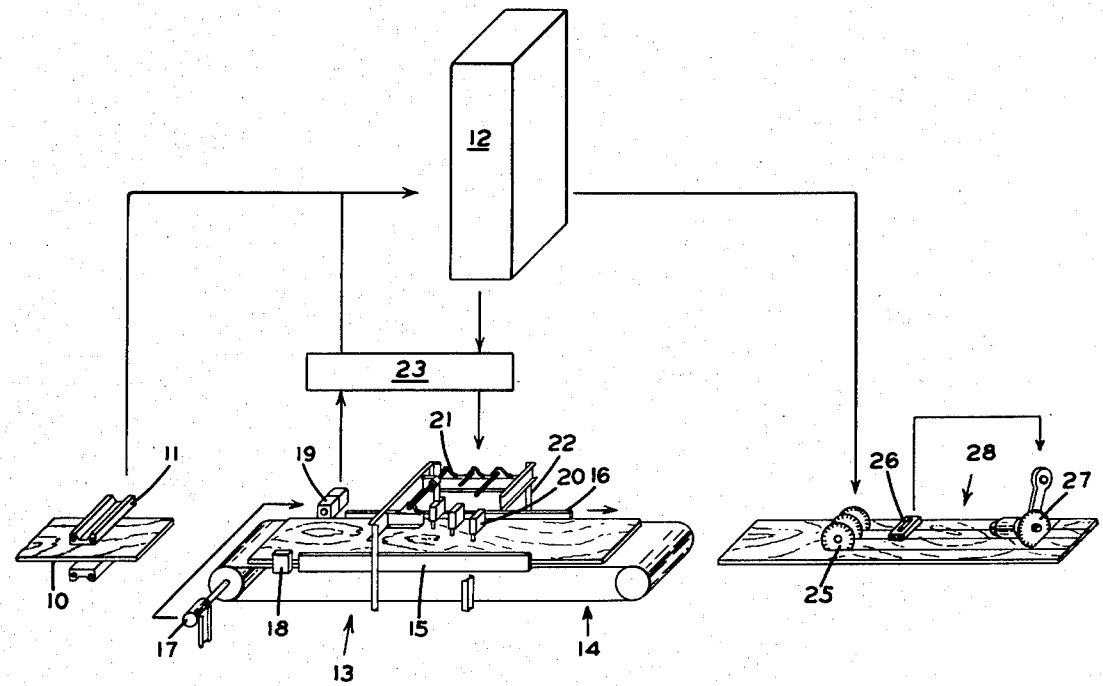

LUMBER MARKING APPARATUS

BACKGROUND OF THE INVENTION

The present invention relates generally to automatically-controlled marking devices and, more specifically, to devices for spray marking lumber boards at predetermined locations while they are conveyed past the apparatus.

Lumber for use in the manufacture of furniture must be free from defects such as checks, loose knots, or planar skips. Because of the high cost of clear boards of matched lengths, it has become customary to process boards containing imperfections to remove the defects and use the boards so processed to make glued-up stock. In the past, such processing of defective boards has entailed manually severing the boards to cut out the imperfect parts. These operations have been labor intensive, and as a result of their reliance on human judgment to determine how and where boards should be cut, the lumber has not always been processed with maximum efficiency.

Consequently, computer-controlled sawing systems have been developed to process lumber to be used in the manufacture of glued-up stock. These operations normally involve several processing steps, including visually inspecting the lumber and marking any defects with luminous paint, scanning the boards to detect and record the relative positions of the marked defects, automatically computing the most efficient way to cut the boards, and then ripping and crosscutting the boards to remove the defects.

Before the boards are ripped, those parts of the boards which will comprise strips after the ripping operation are marked at the points at which they are to be crosscut. Crosscutting is then later automatically accomplished after ripping in a separate operation based on the position of the points marked on each strip. In order to provide for the continuous operation of the machinery, the lumber should be marked while it is in the process of being conveyed. Spray marking has been found to be the only reliable method of applying marks to the rough surfaces of lumber boards while they are moving relative to the marking device. The spray marks must, however, be accurately located on the surfaces of the boards and be sufficiently well-defined so as to be easily detectable. Furthermore, the spray marks must be applied at high speed so as not to impede the progress of the processing operation.

Accordingly, it is a principle object of the present invention to provide a lumber board making apparatus capable of reliably spray marking moving lumber boards at predetermined locations.

It is another object of the present invention to provide a board marking apparatus capable of accurately applying marks to lumber boards with sufficient speed so as not to impede the progress of associated processing operations.

It is a further object of the present invention to provide a lumber board marking apparatus capable of applying well-defined and easily detected marks to moving boards and to provide a marking apparatus otherwise well suited to the purposes for which the same is intended.

SUMMARY OF THE INVENTION

An apparatus for spray marking boards moving on a conveyor comprising a tachometer and photoelectric unit, a solenoid operated paint sprayer, and corresponding circuitry for processing of electric signals from the tachometer and photoelectric unit and control of the paint sprayer. The tachometer and photoelectric unit measure the speed and define the location of boards on the conveyor. The paint sprayer applies marks to the board by use of a straight line flow path atomizing air nozzle. The timing of the application of the marks to the boards and, therefore, the location of the marks is controlled by special circuitry associated with the tachometer, photoelectric unit, and paint sprayer. This circuitry acts to provide correction information to the controlling computer and to process instructions from the computer to the sprayer so the paint marks may be applied accurately to the boards under all conditions.

DESCRIPTION OF THE PREFERRED EMBODIMENT

Figure 1:
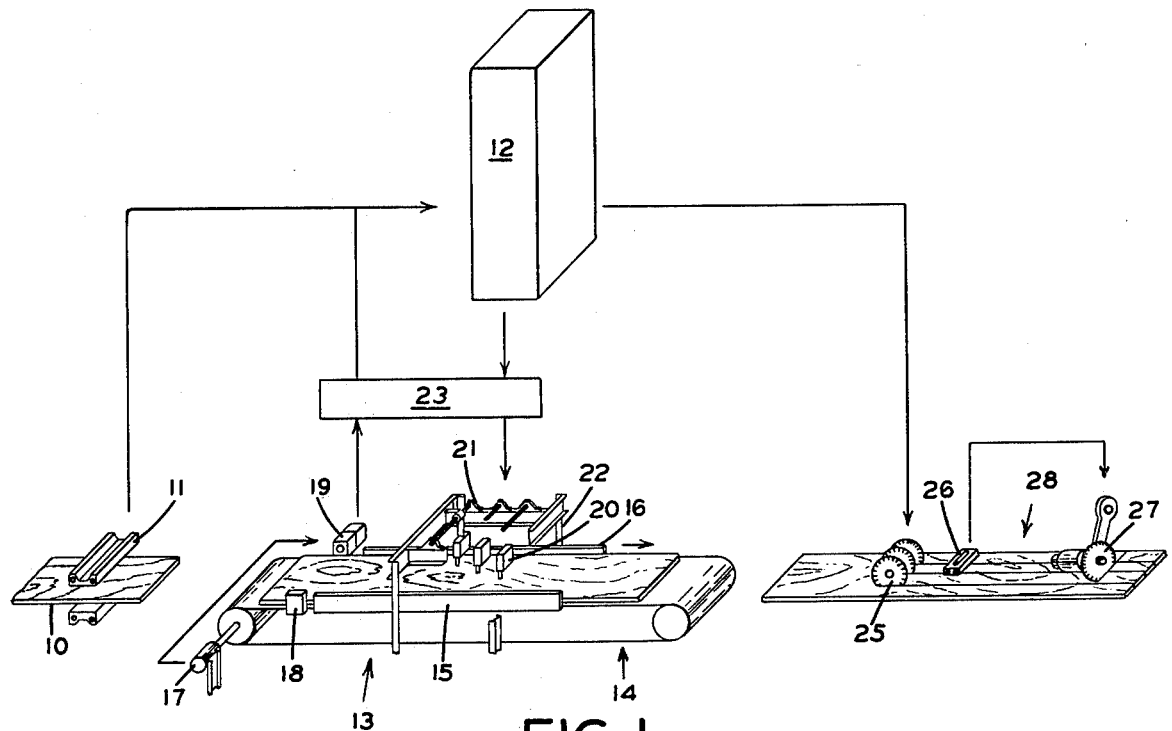
FIG. 1 is a partially broken away pictorial view of the present invention and overall system in which it operates.

Referring now to the figures wherein like reference characters designate like or corresponding parts throughout the several views, FIG. 1 shows the components of the present invention disposed in the overall system in which they operate. Boards 10 are inspected by scanner 11 which detects the location of any defects on the boards which are marked with fluorescent paint and delivers this information to computer 12. Computer 12 registers the position of the defects on the boards 10 and calculates the optimum positions at which the boards should be ripped and crosscut to remove the defects. Boards 10 are transferred to the spray marking apparatus 13 where in response to instructions from the computer 12 the boards are marked at the positions at which they will be later crosscut by paint sprayer 20 as they are transported on conveyor 14. After being marked, the boards are automatically ripped into strips 28 by saws 25. The crosscut position marks on these strips 28 are then detected by scanner 26, and these strips are automatically crosscut at these positions by saws 27.

Figure 3:
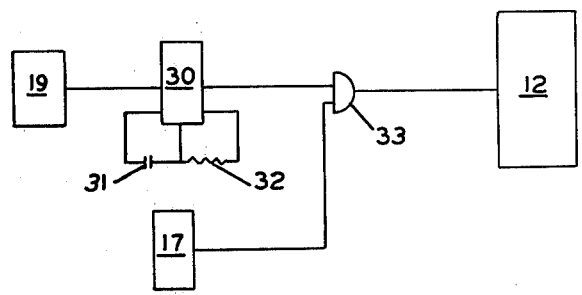
FIG. 3 is a circuit diagram of certain electronic components associated with the tachometer and photoelectric unit of the present invention.

Examining the operation of the spray marking apparatus 13 in greater detail, tachometer generator 17 is attached to the conveyor 14 and produces digital pulses at a rate proportional to the speed of the conveyor. The photoelectric unit comprises sending component 18 and receiver 19 disposed on opposite sides of conveyor 14 which produce a step-down function output when the light path between the two components is interrupted. The output of tachometer generator 17 and the photoelectric unit is coupled to electronic processor 23 which, in turn, communicates with computer 12. As illustrated in FIG. 3, the output of the photoelectric unit is connected to a monostable multivibrator 30 such as a Digital Equipment Corporation K323 circuit board. This multivibrator 30 is coupled to resistor 31 and capacitor 32 which complete the multivibrator circuitry and set the output pulse width. In the instant case, a 2 mfd. capacitor and a 50K resistor may be employed to obtain 8 millisecond wide output pulses from the multivibrator 30 upon activation of the component by a step function input from the photoelectric unit. The output of the multivibrator 30 and of the tachometer 17 are connected to an AND gate 33 such as a Texas Instruments 7400 integrated circuit. The AND gate 33 is connected to the computer 12 and produces a signal output to the computer only when it simultaneously is receiving high-level logic signals from both the multivibrator 30 and the tachometer 17. The output signal is generated when a board interrupts the light path maintained by the photoelectric unit across the conveyor and consists of a series of pulses corresponding in number to the relative speed of the board on the conveyor 14. This signal informs the computer of the location and speed of boards 10 on the conveyor 14.

During its transit across marking apparatus 13, boards 10 are kept transversely positioned by a retaining means 16 which presses them against fence 15. A set of paint sprayers 20 are suspended over the conveyor 14, and over the path of any boards thereon, by a support structure 22 including a set of ball screws 21 by which the transverse position of any of the paint sprayers may be adjusted. In operation, the computer 12 tracks the location of boards on the conveyor 14 and consistent with its computations of where the boards 10 should be optimumly ripped and crosscut positions the paint sprayers 24 relative to the fence 15 and signals the paint sprayers to mark the boards at the desired positions as they pass underneath.

Figure 2:
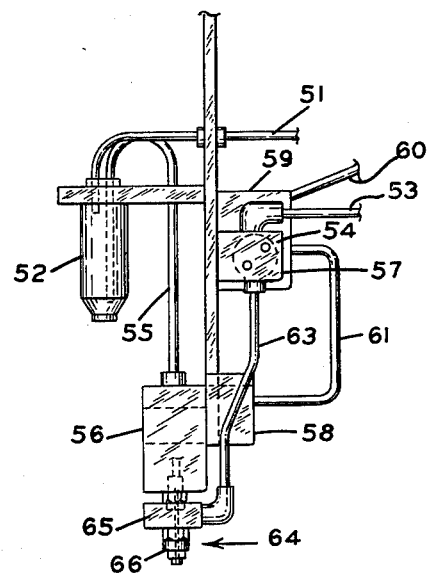
FIG. 2 is a detailed side view of one of the paint sprayers of the present invention.

Referring now to FIG. 2, paint sprayer 20 is supplied with pressurized air by line 51 leading to paint reservoir 52 and by line 53 leading to air valve 54. Reservoir 52 is, in turn, connected by line 55 to paint valve 56. Air valve 54 and paint valve 56 are operated by solenoids 57 and 58 respectively. Solenoid 57 is connected to electronic processor 23 through junction box 59 by line 60; solenoid 58 is connected to the processor through junction box 59 by line 61. Electronic processor 23 receives input from computer 12, which input comprises signals directing the activation of the paint sprayer. Processor 23 coordinates these signals with the mechanical operation of the paint sprayer properly sequencing the activation of the air and paint valves so the paint marks may be efficiently applied to the boards. Air valve 54 and paint valve 56 are connected to nozzle 64 by line 63 and coupling plug 65 respectively. Nozzle 64 is an atomizing air nozzle having a straight line flow path to minimize plugging problems and is equipped with a fan-patterned atomizing air nozzle tip 66.

Figure 4:
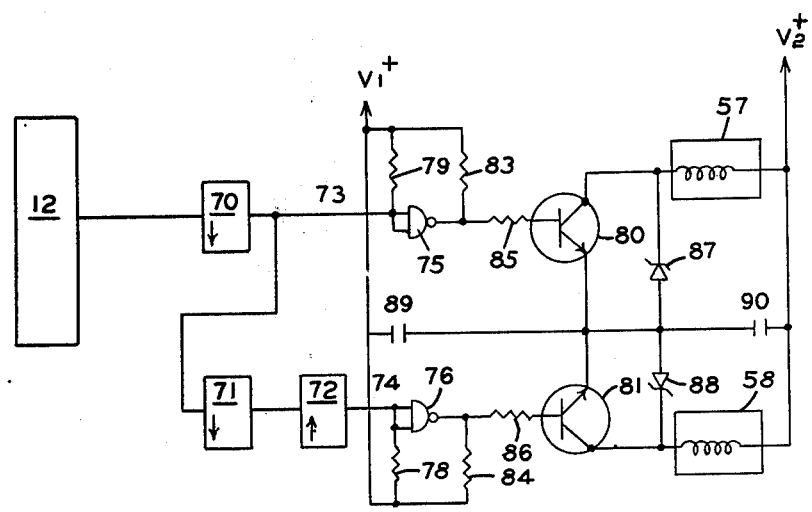
FIG. 4 is a circuit diagram of the signal processing electronic components which direct the activation of the paint sprayer.

On account of the position of the valves relative to the nozzles and the properties of the fluids being employed, the air valve 54 must be activated prior to activating the paint valve 56 in order to provide well-defined marks with paint sprayer 20; and for optimum results, the air valve should be operated for 4–8 milliseconds and then after a 2–4 millisecond delay, the paint valve should be operated for 2–3 milliseconds. The circuit illustrated in FIG. 4 provides this sequencing of valve operations by controlling the activation of solenoids 57 and 58 on receipt pulse signals from the computer 12 directing operation of the paint sprayer 20.

The output signal from computer 12 is coupled to monostable multivibrator 70 which is adjusted to provide a low-level logic output pulse of 4–8 milliseconds duration in response to any pulse inputs from the computer. Multivibrator 70 has one output coupled to monostable multivibrator 71 which is adjusted to provide a high-level logic output pulse of 2–4 milliseconds duration when triggered by the voltage step-up at the trailing edge of pulses from multivibrator 70. The output of multivibrator 71 is, in turn, coupled to monostable multivibrator 72 which is adjusted to provide a low-level logic output pulse of 2–3 milliseconds duration when triggered by the voltage step-down at the trailing edge of the pulses from multivibrator 72. Multivibrators 70, 71, and 72 may be any standard monostable multivibrators such as the type supplied on a Digital Equipment Corporation K-323 circuit board. The resulting coordinated outputs on lines 73 and 74 are a 4–8 millisecond pulse on line 73 followed after a 2–4 millisecond interval by a 2–3 millisecond pulse on line 74. These pulses are coupled through buffers 75 and 76 which are connected to a 5 volt source through pull-up resistors 78 and 79 and function to increase the voltage level and power of the pulses. Buffers 75 and 76 may be any two input positive NAND buffers such as Texas Instruments SN7438 integrated circuits. The output of buffers 75 and 76 is coupled to the bases of power transistors 80 and 81, such as RCA 2N6533 Darlington transistors. The emitters of power transistors 80 and 81 are connected to ground, and their collectors are connected to a 50 volt power source through solenoids 57 and 58 respectively. Resistors 83, 84, 85, and 86 are employed to pull up the output of the buffers 75 and 76 and to provide biasing to the transistors 80 and 81. Zener diodes 87 and 88 and capacitors 89 and 90 are employed to protect the circuit components against voltage spikes, caused by the switching action of the transistors and the action of the solenoids, and to protect the circuit against noise, respectively. When coupled through buffers 75 and 76 and output transistors 80 and 81 to solenoids 57 and 58, the pulses from lines 73 and 74 provide for the operation of solenoids 57 and 58 with proper valve action sequence timing; namely, the operation of the air valve for 4–8 milliseconds and then the operation of the paint valve for 2–3 milliseconds after a 2–4 millisecond delay.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a computer controlled sawing system in which the position at which boards are to be crosscut is marked by direction of said computer while said boards are moving on a conveyor in order that the crosscuts may later be automatically made:
   (a) a paint sprayer including an atomizing air nozzle, a solenoid-operated paint valve to control paint flow to said nozzle, and a solenoid-operated air valve to control air flow to said nozzle;
   (b) a tachometer generator connected to said conveyor which operates to produce pulses at a rate proportioned to the speed of said conveyor and the board moving thereon;
   (c) a photoelectric unit which provides a step function output when a board moves past said unit on said conveyor;

(d) electronic circuitry connected to said tachometer and said photoelectric unit including a monostable multivibrator means coupled to an AND gate to provide an output signal of digital pulses to said computer, which signal defines the speed and location of boards on said conveyor; and (e) means for controlling said paint and air valve solenoids in order that signals from said computer directing the operation of said solenoids may be processed to provide relief valve sequence timing, said means for controlling said paint and air valve solenoids comprising:

(1) a first monostable multivibrator;
(2) a first NAND gate coupled to receive the output of said first multivibrator;
(3) a first power transistor connected to said first NAND gate and said air valve solenoid;
(4) a second monostable multivibrator coupled to receive an output from said first multivibrator;
(5) a third multivibrator coupled to receive the output of said second multivibrator;
(6) a second NAND gate coupled to receive the output of said third multivibrator; and
(7) a second power transistor connected to said second NAND gate and said paint valve solenoid.

2. The combination of claim 1 wherein said monostable multivibrator means are adjusted to operate said air valve solenoid for 4–8 milliseconds and then said paint valve solenoid is activated for 2–3 milliseconds after a 2–4 millisecond delay.

* * * * *